United States Patent
Li et al.

(10) Patent No.: US 9,169,143 B2
(45) Date of Patent: Oct. 27, 2015

(54) WASTEWATER PRETREATMENT METHOD AND SEWAGE TREATMENT METHOD USING THE PRETREAMENT METHOD

(76) Inventors: Jinmin Li, Linyi (CN); Liankui Zhou, Linyi (CN); Dayong Li, Linyi (CN)

( * ) Notice: Subject to any disclaimer, the term of this patent is extended or adjusted under 35 U.S.C. 154(b) by 618 days.

(21) Appl. No.: 13/512,424

(22) PCT Filed: Dec. 1, 2010

(86) PCT No.: PCT/CN2010/079323
§ 371 (c)(1),
(2), (4) Date: May 29, 2012

(87) PCT Pub. No.: WO2011/066790
PCT Pub. Date: Jun. 9, 2011

(65) Prior Publication Data
US 2012/0234751 A1 Sep. 20, 2012

(30) Foreign Application Priority Data

Dec. 1, 2009 (CN) .......................... 2009 1 0249722
Jan. 15, 2010 (CN) .......................... 2010 1 0000737

(51) Int. Cl.
*C02F 3/30* (2006.01)
*C02F 11/02* (2006.01)

(52) U.S. Cl.
CPC . *C02F 3/30* (2013.01); *C02F 11/02* (2013.01); *Y02W 10/27* (2015.05); *Y10S 210/906* (2013.01)

(58) Field of Classification Search
CPC .................................. C02F 3/30; C02F 11/02
USPC ........................... 210/605, 620, 621, 623, 630
See application file for complete search history.

(56) References Cited

U.S. PATENT DOCUMENTS 3,980,556 A 9/1976 Besik
4,168,228 A 9/1979 Mallatt et al.
(Continued)

FOREIGN PATENT DOCUMENTS

CN 1769212 A 5/2006
CN 1778725 A 5/2006
(Continued)

OTHER PUBLICATIONS

Machine-generated English Translation of CN 101381185, generated on Nov. 10, 2014.*
(Continued)

*Primary Examiner* — Fred Prince
(74) *Attorney, Agent, or Firm* — Novick, Kim & Lee, PLLC; Allen Xue (57) ABSTRACT

A pretreatment method is provided, which comprises the following steps: (1) wastewater feed is introduced into a first end of a first aeration basin, and is mixed with a first concentrated mixed liquor to obtain a first mixed liquor; (2) the first mixed liquor is aerated in the aeration stage of the first aeration basin to obtain a second mixed liquor at a second end of the first aeration basin; (3) the second mixed liquor is introduced into a first sedimentation basin to obtain a supernatant and the first concentrated mixed liquor; (4) the supernatant is discharged and at least a part of the first concentrated mixed liquor is returned to the first end of the first aeration basin. At the same time, a sewage treatment method using the wastewater pretreatment method is provided. The pretreatment method can be used steadily for a long time without discharging sludge.

23 Claims, 2 Drawing Sheets

(56) References Cited

U.S. PATENT DOCUMENTS

| | | | |
|---|---|---|---|
| 5,374,353 A * | 12/1994 | Murphy | 210/121 |
| 5,441,634 A | 8/1995 | Edwards | |
| 6,423,214 B1 * | 7/2002 | Lindbo | 210/122 |
| 6,783,679 B1 | 8/2004 | Rozich | |
| 6,884,354 B1 * | 4/2005 | Calltharp | 210/620 |
| 7,041,219 B2 * | 5/2006 | Tharp et al. | 210/620 |

FOREIGN PATENT DOCUMENTS

| | | |
|---|---|---|
| CN | 101045577 A | 10/2007 |
| CN | 101229948 A | 7/2008 |
| CN | 101381185 A | 3/2009 |
| DE | 2952342 A1 | 7/1981 |
| JP | H06-182377 A | 7/1994 |
| JP | H06-182389 A | 7/1994 |
| JP | 2004-267881 A | 9/2004 |
| JP | 2005-279351 A | 10/2005 |
| JP | 2007-105630 A | 4/2007 |
| KR | 20040031359 A | 4/2004 |

OTHER PUBLICATIONS

Hasar et al. (online: 2004). An alternative for pre-treatment of high-strength raw whey wastewater: submerged membrane bioreactors., J Chem Technol Biotechno, 79:1361-1365.

Tchobanoglous et al. (1991). Advanced wastewater treatment. In Wastewater engineering: treatment, disposal, and reuse/Metcalf &Eddy, Inc, 3rd ed. (chapter 11; p. 545). New York: McGraw-Hill.

* cited by examiner

WASTEWATER PRETREATMENT METHOD AND SEWAGE TREATMENT METHOD USING THE PRETREAMENT METHOD

The present application claims the priorities of the following patent applications: (1) Chinese patent application 200910249722.X, filed on Dec. 1, 2009; and (2) Chinese patent application 201010000737.5, filed on Jan. 15, 2010. The contents of these patent applications are incorporated into the present application by reference.

TECHNICAL FIELD

The present invention relates to a wastewater pretreatment method and sewage treatment method using the pretreatment method, especially to a waste pretreatment method with a sludge feed, and a use thereof for sewage treatment.

BACKGROUND ART

Many municipal sewage treatment plants in China are used as disposal sites of wastewater indirect emission sources, to receive various wastewaters, in particular industrial wastewaters with increasingly complicated components. The 2007 Environmental State Report of Zhejiang Province shows that only 58.8% of 50 municipal sewage treatment plants in normal operation in the province meet the discharge standards, and the main pollution factors beyond the standards are ammonia nitrogen and total phosphorus. The industrial wastewaters without pretreatment usually have a load of nitrogen and phosphorus exceeding the processing capacity of sewage plants, interfering the normal operation of sewage treatment devices, so that the sewage treatment plants become an important source of nitrogen and phosphorus in water bodies. Hence, wastewater from various sources usually should be pretreated to meet the requirements of sewage treatment plants, especially meet the influent requirements of sewage biotreatment plants.

At present, the frequently used wastewater pretreatment method is dilution method, in which when pollutant levels in wastewater exceed their tolerable limits for biotreatment, a simple dilution method can be adopted to decrease the pollutant levels below their limits so as to ensure the normal operation of biotreatment. The most simple and economic method is wastewater dilution method, i.e., mixing different wastewaters and/or sewages together to dilute each other so as to reduce pollutant levels below their tolerable limits. In some cases, the effluent water during the process or clear water can also be used for dilution. However, the pollutant levels of wastewater and/or sewage usually are very high, so that it is difficult to reduce the pollutant levels below their tolerable limits even by the mixing. In addition, the use of effluent water during the process or the clear water for dilution will cause a significant increase of treatment cost.

In addition, many sewage treatment plants usually meet in practical operation the following problems: (1) insufficient amount of sewage feed, mainly resulted from advanced design and failures in sanitary sewer system, which may influence the operation of sewage treatment apparatus; (2) unstable quality of sewage feed, mainly resulted from draining industrial wastewater into sanitary sewer system and living habit changes caused by holidays and seasonal variation, which may form shock load to influence sewage treatment effects; (3) carbon-source deficiency, as a common problem of sewage treatment plants, mainly attributed to modern living habits, which may result in unbalance of nutrients in organisms and influence the removal effects of nitrogen and phosphorus. Facing these challenges, conventional activated sludge methods usually have the following drawbacks: (1) low biomass concentration in aeration basin; (2) poor ability in resisting shock load of quality and amount of sewage feed; (3) easy sludge bulking; (4) high yield of sludge; (5) high cost in construction and operation, and large floor space, etc.

Hence, novel wastewater pretreatment methods to make the pretreated wastewater more suitable for biotreatment methods are still in need.

CONTENTS OF THE INVENTION

In one aspect, the present invention provides a wastewater pretreatment method, comprising the following steps:

(1) introducing a wastewater feed into a first end of a first aeration basin to mix with a first concentrated mixed liquor to obtain a first mixed liquor;

(2) aerating the first mixed liquor in an aeration section of the first aeration basin to obtain a second mixed liquor at a second end of the first aeration basin;

(3) introducing the second mixed liquor to a first sedimentation basin and subjecting to a sedimentation treatment to obtain a supernatant liquid and the first concentrated mixed liquor;

(4) discharging the supernatant liquid, and returning at least a part of the first concentrated mixed liquor to the first end of the first aeration basin so as to have a sludge age of greater 50 days, preferably greater than 100 days, more preferably greater than 300 days, more preferably greater than 1000 days, more preferably greater than 2000 days, and more preferably greater than 5000 days.

Usually, with the increase of sludge age, the amount of residual sludge discharged from the whole system will decrease, thereby facilitating the improvement of environment and the reduction of operation cost.

According to some embodiments of the wastewater pretreatment method of the present invention, before the wastewater feed is introduced to the first end of the first aeration basin, the wastewater feed is subjected to sand sedimentation treatment so that sand sedimentation amount per ton of wastewater is less than 0.1 liter, preferably less than 0.05 liter, more preferably less than 0.03 liter.

According to some embodiments of the wastewater pretreatment method of the present invention, the first mixed liquor has a sludge concentration of 2,000 to 30,000 mg/L, preferably 2,500 to 20,000 mg/L, more preferably 3,000 to 10,000 mg/L, more preferably 3,000 to 7,000 mg/L. In some cases, the first mixed liquor has a ratio of mixed liquor volatile suspended solid (MLVSS) to mixed liquor suspended solid (MLSS) of less than 0.8, preferably less than 0.7, more preferably less than 0.5.

According to some embodiments of the wastewater pretreatment method of the present invention, the aeration treatment in the first aeration basin is performed for 0.1-4 h, preferably 0.5-2 h, more preferably 0.5-1.5 h.

According to some embodiments of the wastewater pretreatment method of the present invention, the sedimentation treatment in the first sedimentation basin is performed for 0.8-6 h, preferably 1-4 h, more preferably 1-3 h.

According to some embodiments of the wastewater pretreatment method of the present invention, the ratio of the time for aeration treatment in the first aeration basin to the time for sedimentation treatment in the first sedimentation basin is 1:0.5 to 1:6, preferably 1:1 to 1:3, more preferably 1:1.5 to 1:2, most preferably 1:2.

According to some embodiments of the wastewater pretreatment method of the present invention, the chemical oxygen consumption (COD) of the supernatant is 30-500 mg/L, preferably 50-250 mg/L, more preferably 80-150 mg/L.

According to some embodiments of the wastewater pretreatment method of the present invention, an organic nutrition and/or a sludge feed can be also introduced together with the wastewater feed into the first end of the first aeration basin and mixed with the first concentrated mixed liquor to obtain the first mixed liquor. The organic nutrition can be a domestic sewage containing biodegradable organics, an industrial wastewater derived from agricultural products as raw materials, or any suitable carbon sources, such as methanol, starches, molasses, etc., and the sludge can be any sludge containing activated sludge generated in sewage biotreatment processes.

According to some embodiments of the wastewater pretreatment method of the present invention, the aeration treatment in the step (2) is performed in a manner of intermittent aeration or continuous aeration. By controlling aeration rate and aeration time, the COD of the supernatant can be effectively controlled in a desired range, for example, meeting the water quality standards of sewage that can be discharged in a municipal sewer.

According to some embodiments of the wastewater pretreatment method of the present invention, in the step (2), the second mixed liquor has a dissolved oxygen concentration of 0.1-4 mg/L, preferably 1.5-3 mg/L, more preferably 2-3 mg/L.

According to some embodiments of the wastewater pretreatment method of the present invention, the first mixed liquor, the second mixed liquor and the first concentrated mixed liquor contain facultative microorganisms as dominant floras.

According to some embodiments of the wastewater pretreatment method of the present invention, the first aeration basin and the first sedimentation basin are operated in plug flow manner.

In another aspect, the present invention further provides a sewage treatment method, in which the supernatant of the wastewater pretreatment method is used as sewage feed.

According to some embodiments of the sewage treatment method of the present invention, the supernatant as sewage feed passes a biologic regulation zone, a second aeration zone and a second sedimentation zone in turn to obtain a first water effluent and a second concentrated mixed liquor, and a first part of the second concentrated mixed liquor returns to the biologic regulation zone.

According to some embodiments of the sewage treatment method of the present invention, the second sedimentation zone is operated in a manner of SBR. In some cases, the ratio of mixed liquor volatile suspended solid (MLVSS) to mixed liquor suspended solid (MLSS) in SBR basin is less than 0.8, preferably less than 0.7, more preferably less than 0.5.

According to some embodiments of the sewage treatment method of the present invention, the fluid residence time of the biologic regulation zone is 0.2-2 h, preferably 0.5-1.5 h, more preferably 0.5-1 h.

According to some embodiments of the sewage treatment method of the present invention, the aeration treatment time of the second aeration zone is 0.5-4 h, preferably 0.5-2 h, more preferably 1-2 h.

According to some embodiments of the sewage treatment method of the present invention, the sedimentation treatment time is 0.8-6 h, preferably 1-4 h, more preferably 1.5-3 h.

According to some embodiments of the sewage treatment method of the present invention, the biologic regulation zone comprises an anaerobic section and an anoxic section, the supernatant and the first part of the second concentrated mixed liquor are mixed and pass the anaerobic section to obtain a third mixed liquor, the third mixed liquor and a first part of a fifth mixed liquor are mixed and pass the anoxic section to obtain a fourth mixed liquor, the fourth mixed liquor enters the second aeration zone and is subjected to aeration treatment to obtain the fifth mixed liquor, the first part of the fifth mixed liquor returns to the anoxic section, the residual part of the fifth mixed liquor enters the second sedimentation zone and is separated to obtain the first water effluent and the second concentrated mixed liquor, and the first part of the second concentrated mixed liquor returns to the anaerobic section.

According to some embodiments of the sewage treatment method of the present invention, the anaerobic section of the biologic regulation zone has a fluid residence time of 0.1-1.5 h, preferably 0.5-1 h.

According to some embodiments of the sewage treatment method of the present invention, the ratio of the fluid residence time of the anaerobic section to the fluid residence time of the anoxic section in the biologic regulation zone is 1:0.5 to 1:6, preferably 1:1 to 1:3, more preferably 1:1.5 to 1:2, most preferably 1:2.

According to some embodiments of the sewage treatment method of the present invention, the fourth mixed liquor has a sludge concentration of 2000-6000 mg/L, preferably 2500-5000 mg/L, more preferably 3000-4000 mg/L.

According to some embodiments of the sewage treatment method of the present invention, the first part of the fifth mixed liquor has a flow rate of 10% to 150%, preferably 50% to 100% relative to the flow rate of the sewage feed.

According to some embodiments of the sewage treatment method of the present invention, the first part of the second concentrated mixed liquor has a flow rate of 10% to 150%, preferably 50% to 100% relative to the flow rate of the sewage feed.

According to some embodiments of the sewage treatment method of the present invention, at least part of the residual part of the second concentrated mixed liquor returns to the first end of the first aeration basin of the wastewater pretreatment method. In some cases, all of the second concentrated mixed liquor, except the first part of the second concentrated mixed liquor, as a second part of the second concentrated mixed liquor returns to the first end of the first aeration basin of the wastewater pretreatment method.

According to some embodiments of the sewage treatment method of the present invention, the supernatant can also be used as a sewage feed and subjected to a biotreatment according to Wuhrmann process, A/O process, Bardenpho process, Phoredox process, $A^2/O$ process, reversed $A^2/O$ process, UCT process, MUCT process, VIP process, OWASA process, JHB process, TNCU process, Dephanox process, BCFS process, MSBR process, SBR process, AB process, oxidation ditch process, biomembrane process, moving bed process or a combination thereof, to obtain the first water effluent and an optional residual sludge. In some cases, substantially all of the optional residual sludge returns to the first end of the first aeration basin of the wastewater pretreatment method.

According to some embodiments of the sewage treatment method of the present invention, the first water effluent is introduced into a flocculation clarification basin and subjected to flocculation clarification treatment to obtain a second water effluent and a flocculation sludge. In the flocculation clarification treatment, commonly used flocculation agents are metal salts and polymers. The former includes aluminum sulfate, ferric trichloride, and ferrous sulfate; and the latter include polyaluminum chloride and polyacrylamide, etc. The water quality of the second water effluent is further improved by the flocculation clarification treatment.

According to some embodiments of the sewage treatment method of the present invention, at least part, preferably all of the flocculation sludge returns to the first end of the first aeration basin of the wastewater pretreatment method.

The inventors of the present invention surprisingly found that the use of the wastewater pretreatment method can fulfill a long-term stable run without discharging sludge and sludge accumulation, and the pretreated wastewater (i.e., the supernatant) is suitable for sewage biotreatment.

The wastewater pretreatment method of the present invention can be simply combined with various suitable sewage biotreatment processes to form a new sewage biotreatment method. In particular, the excess sludge generated in the sewage biotreatment method can be treated and digested by the wastewater pretreatment method of the present invention. In addition, the water effluent (i.e., the supernatant) produced by the wastewater pretreatment method of the present invention is usually present in neutrality (i.e., having a pH value between 6 and 9, especially between 6.5 and 7.5) and has a COD value of 30-200 mg/L, it can be subjected to further sewage biotreatment without adjusting pH value and carbon source concentration to obtain a clarified water effluent meeting the emission standards. In particular, the sewage biotreatment of the present invention can achieve good phosphorus removal effect under the condition of substantially not discharging sludge.

As compared to traditional sewage biotreatment methods, the new sewage biotreatment can significantly reduce or even fully eliminate sludge discharge, and still maintain good sewage treatment effects and water effluent quality, having smaller apparatus occupied area, less construction cost and running cost as well as higher capacity of resisting impact load and good operation stability. The wastewater pretreatment method or the sludge reduction treatment method of the present invention is also particularly suitable for reforming various existing sewage biotreatment apparatus to significantly reduce or even fully eliminate sludge discharge.

In the present invention, the term "wastewater" or "sewage" refers to any organic contaminants-containing sewage that can be treated by a method for sewage biotreatment; such sewage includes any suitable industrial wastewaters, domestic sewages and any combinations thereof, especially domestic sewages from cities. The sewage can be a sewage in site produced, a sewage collected from sanitary sewer system, a sewage stored in sewage basin for a period of time, or a sewage obtained by subjecting a sewage to biological, chemical and/or physical treatments such as fermentation, acidic/basic adjusting, composition adjusting, concentration adjusting, sedimentation, filtration, centrifugation, etc. According to the Outdoor Drainage Design Codes (GB50014-2006), Section 6.3, paragraph 6.4.5, "the sand sedimentation amount of sewage can be expressed in 0.03 liter per cubic meter of sewage". In the present invention, the sand sedimentation amount per cubic meter of sewage is usually not greater than 0.1 liter, preferably not greater than 0.05 liter, more preferably not greater than 0.03 liter.

In the present invention, the term "sewage biotreatment" refers to a process in which the organic contaminants in sewage are converted into stable and harmless substances by using the metabolism of microorganisms. According to the microorganism's requirement for oxygen, such processes can be divided into aerobic biotreatment, anaerobic biotreatment, etc.

Figure 1:
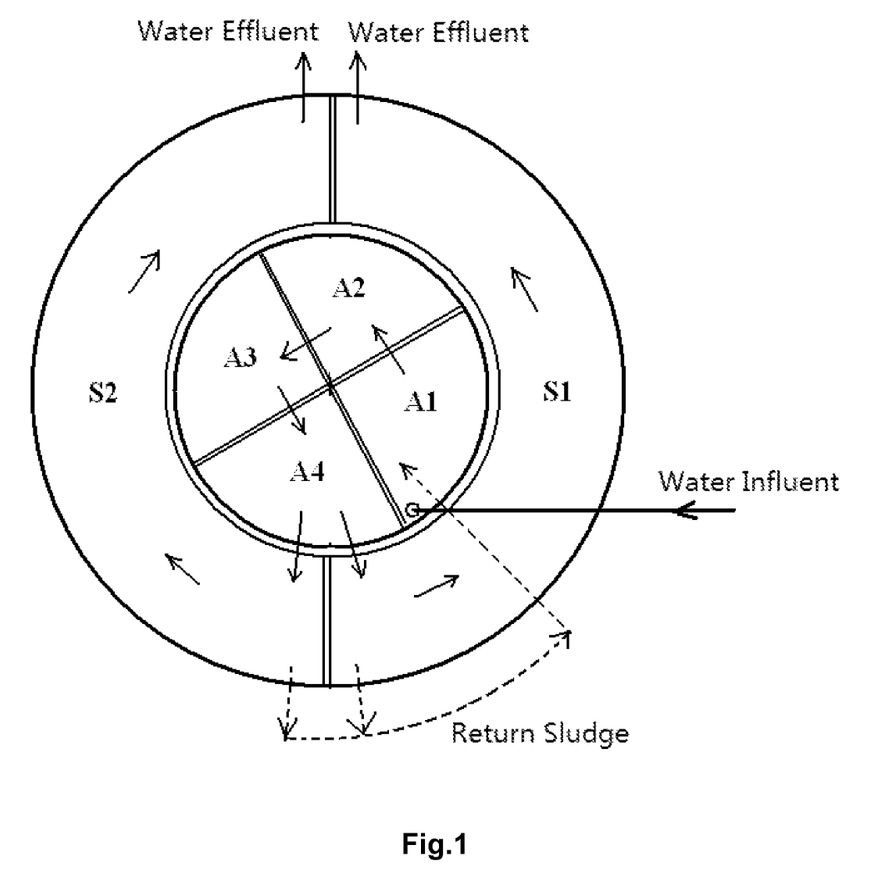
FIG. 1 shows a schematic diagram of structure of a wastewater pretreatment apparatus according to the wastewater pretreatment method of the present invention.

According to the state of microorganisms in water, aerobic biotreatment methods can be divided into activated sludge process and biomembrane process. The activated sludge process is the most popular process for sewage biotreatment, in which air is fed into sewage containing a great amount of organic substances, after a certain time, bioflocs (activated sludge) are formed in water. A lot of microorganisms inhabit and live in the activated sludge and use organic substances in water as foodstuff to gain energy, grow and propagate, thereby purifying sewage. The basic flow of the activated sludge process is shown in FIG. 1. The biomembrane process comprises passing sewage through a solid packing on which a biomembrane in form of sludge is formed, so that a lot of microorganism propagated on the biomembrane can play the same role as the activated sludge in purifying sewage. Apparatus suitable for the biomembrane process comprises biofilter, rotating bio-disc, bio-contact oxidation reactor and fluidized bed bio-reactor.

Anaerobic biotreatment is a treatment process by degrading organic contaminants under anaerobic condition using facultative anaerobes and obligate anaerobes. Apparatus suitable for anaerobic biotreatment comprises common digester tank, anaerobic filter, anaerobic sludge bed, anaerobic rotating disc, anaerobic baffled reactor, etc.

Since sewage contains various contaminants, several processes are usually combined for achieve a desired purification effect. Typically, the processes for sewage biotreatment comprise, as examples, activated sludge process, OSA (Oxic-Settling-Anaerobic) process, anaerobic biotreatment processes (such as anaerobic biofilter, anaerobic rotating disc, anaerobic contact process, up-flow anaerobic sludge bed, sectioned anaerobic digestion process, etc.), Wuhrmann process, A/O process, Bardenpho process, Phoredox process, $A^2/O$ process, reversed $A^2/O$ process, UCT process, MUCT process, VIP process, OWASA process, JHB process, TNCU process, Dephanox process, BCFS process, SBR (Sequencing Batch Reactor Activated Sludge Process), MSBR process, AB process, biomembrane process such as biofilter, bio-rotating disc, bio-contact oxidation process, fluidized bio-bed, aerating biofilter, an any combinations thereof.

In the present invention, the term "sludge" refers to any sludge that contains activated sludge generated in a sewage biotreatment process. The activated sludge is a floc formed with organisms in sewage, mainly comprises water and various microorganisms such as aerobic bacteria, anaerobic bacteria and facultative bacteria, as well as fungi, alga, protozoa, etc. With the acclimatization and environmental change, the various microorganism floras in sewage also change in amount and proportion and even gene mutation in order to adapt survivable environment. According to the sources of sewages, the examples of sewages comprise: a sludge from a secondary sedimentation basin of an activated sludge process (also called as excess or residual sludge or residual activated sludge, mainly comprising microorganisms and water), a sludge from a secondary sedimentation process of a biomembrane process (also called as humic sludge, mainly comprising deciduous biomembrane), a sludge from primary settling basin of a sewage treatment plant (also called as primary sedimentation sludge, mainly comprising solid organics and microorganisms), a sludge from an anaerobic wastewater treatment process (also called as digestion sludge or mature sludge), a sludge from a chemical sedimentation basin (also called chemical sludge), etc. According to the stages in which sludge is generated, the examples of sludge comprises: raw sludge or fresh sludge (i.e., untreated sludge), concentrated sludge, digested sludge, dewatered sludge, dry sludge, etc. The sludge in the present invention can be any one of the above sludge or a combination thereof, especially a residual sludge having a water content of at least 90%, preferably at least 95%, more preferably at least 97%, and preferably a fresh sludge.

In the present invention, the term "mixed liquor" refers to a mixture formed with the above sludge and water, and is as called as "mixture of sludge and water" or "mixed liquor of sludge and water". Suitable mixed liquor has a good sedimentation property, and especially has not a phenomenon of sludge bulking or sludge floatation during aeration and sedimentation procedures. In general, a mixed liquor advantageously has a sludge volume index (SVI, such as $SVI_{30}$ which refers to the volume occupied by 1 g of activated sludge solid after 1000 mL of the mixed liquor stands in a 1000 mL volumetric cylinder for 30 minutes, the unit thereof is mL/g) less than the minimum SVI that sludge bulking occurs during aeration, for example, $SVI_{30}$ can be less than 200 mL/g, 150 mL/g, 100 mL/g, or 50 mL/g.

In the present invention, the term "concentrated mixed liquor" refers to a mixed liquor that has an elevated concentration of sludge and is obtained by separating the above mixed liquor to remove at least part of water. In some cases, the term "concentrated mixed liquor" is also called as sludge, for example, "first concentrated mixed liquor" may also be called as "first sludge". The "separating" step can be achieved by sedimentation, centrifugation, filtration, etc. In the case of sedimentation, sludge in a mixed liquor subsides downward to generate a supernatant at the upper portion of the mixed liquor and a concentrated mixed liquor with an elevated sludge concentration at the lower portion of the mixed liquor. In some cases, the lower portion used as the concentrated mixed liquor is 5 to 85% (such as: 5 to 10%, 10 to 15%, 15 to 20%, 20 to 25%, 25 to 30%, 30 to 35%, 35 to 40%, 40 to 45%, 45 to 50%, 50 to 55%, 55 to 60%, 65 to 70%, 70 to 75%, 75 to 80%, 80 to 85%) of the total mixed liquor.

In the present invention, the term "sludge content", "sludge amount" or "sludge concentration" usually refers to the content of suspended solids in a sludge or a sewage or a mixed liquor or a concentrated mixed liquor. In general, the solids or suspended solids mainly comprise organisms or organic solid substances (including biodegradable and non-biodegradable organic substances). In some cases, sludge content can also be expressed as the total amount of MLSS (mixed liquor suspended solids), which is also called as "mixed liquor sludge concentration", referring to the total weight of activated sludge solid (mg/L) in one unit volume of the mixed liquor in aeration basin.

In the present invention, the term "sludge age" refers to an average residence time of activated sludge, usually expressed as SRT. The formula for calculating SRT is: (effective volume of aeration basin*sludge concentration of mixed liquor in aeration basin)/(volume of discharged sludge per unit of time*sludge concentration of discharged sludge). In general, it is a method for selecting microorganism species in activated sludge system by controlling sludge age. If a microorganism species has a generation cycle longer than the sludge age of activated sludge system, the microorganism will be removed with the discharged residual sludge before the microorganism produces the next generation of microorganism, and thus the microorganism can never be multiplied in the system. On the contrary, if a microorganism species has a generation cycle shorter than the sludge age of activated sludge system, the microorganism will produce the next generation before the microorganism is removed with the discharged residual sludge, and thus the microorganism can survive in the activated sludge system, and be multiplied and used for sewage treatment. SRT directly determine the age of microorganisms in the activated sludge system. In general, a young activated sludge is potent in decomposition and metabolism of organic contaminants but has poor agglomeration and sedimentation properties, while an old activated sludge is week in decomposition and metabolism of organic contaminants but has good agglomeration properties.

In the present invention, the term "oxygen-supplying treatment/process" refers to a process allowing oxygen to contact with a mixed liquor, especially a process allowing an oxygen-containing gas (such as air) to contact with a mixed liquor. In the present invention, "oxygen-supplying treatment" can be realized by any methods that allow an oxygen-containing gas to contact with a mixed liquor. For example, it can be realized by feeding an oxygen-containing gas into flowing or non-flowing mixed liquor, especially by aerating mixed liquor with an oxygen-containing gas. Usually, aerobic treatment is a typical "oxygen-supplying treatment". In general, aerobic treatment can be performed under any suitable conditions in any suitable manners, for example, under a condition such as normal pressure, positive pressure, room temperature, low or high temperature in a manner such as airblast aeration, mechanical aeration, jet aeration in a suitable device such as aeration basin, aeration ditch, fluidized bed, moving bed or membrane, etc. Aeration basin is preferably used for aeration. Any suitable oxygen-containing gases can be used for aeration, and air is preferably used for aeration. During oxygen-supplying treatment, the dissolved oxygen concentration in mixed liquor can be gradually elevated to a desired level. The time for oxygen-supplying treatment usually is determined by the retention time of the mixed liquor in an oxygen-supplying treatment device or the time that the mixed liquor contacts with oxygen and the amount of the oxygen-containing gas fed in the mixed liquor. Usually, during the oxygen-supplying treatment, the growth of aerobes and facultative organism is enhanced, while anaerobes are inhibited.

In the present invention, the term "anoxic treatment/process" refers to a process allowing a mixed liquor essentially not to contact with an oxygen-containing gas. Anoxic treatment can be realized in any manner that can essentially avoid the contact between an oxygen-containing gas and a mixed liquor. For example, anoxic treatment can be realized by stopping aeration and an optional degassing step. In the present invention, a mixed liquor is subjected to an anoxic treatment as long as there essentially is not dissolved oxygen, e.g., when dissolved oxygen level is lower than 0.1 mg/L, whether nitrate nitrogen exists or not. That is, the anoxic treatment of the present invention can be performed under anoxic conditions (in the presence of nitrate nitrogen and the absence of dissolved oxygen) or anaerobic conditions (in the absence of nitrate nitrogen and dissolved oxygen) as mentioned in the prior art. In some cases, with the escape of oxygen-containing gas and the consumption of dissolved oxygen, the concentration of dissolved oxygen gradually decreases to a desired value, such as about 0 mg/L. In particular, anoxic treatment can be realized by stopping aeration and allowing the mixed liquor slowly flow in a sedimentation basin. Suitable sedimentation basin can be a horizontal flow basin, vertical flow basin or radial flow basin. The time for anoxic treatment usually is determined by the retention time of mixed liquor in an anoxic treatment device. In general, during anoxic treatment, the growth of anaerobes and facultative organisms is enhanced, while aerobes are inhibited.

The inventors of the present invention surprisingly found that during a long-term running, although substantially all of the first concentrated mixed liquor returns to the first end of the first aeration basin, the sludge amount in the first mixed liquor still maintains at a relatively stable level and does not increase without limit. In some preferable embodiments, the wastewater pretreatment method of the present invention can stably run for a long-term without discharging sludge under a condition of continuously loading wastewater feed, so that the discharge of sludge is eliminated. Hence, the wastewater pretreatment method of the present invention is a sludge reduction treatment method. In addition, the inventors of the invention further surprisingly found that even wastewater contains high levels of carbon, nitrogen and phosphorus and the first concentrated mixed liquor is not discharged at all, the contents of carbon, nitrogen and phosphorus in the supernatant can still maintain at a relatively low levels, namely, the wastewater pretreatment method of the present invention has significant effects of removing carbon, nitrogen and phosphorus.

Without being limited to any theories, the inventors of the present invention think some reasons that the wastewater pretreatment method of the present invention can run for a long term without discharging sludge are as follows.

Firstly, since the wastewater contains nutritions and the nutrition concentration in the supernatant decreases, and the sludge concentration of the mixed liquor during stable running does not continuously increase but keeps at a high level stably, it can be deemed that the organism floras in the mixed liquor is of a balanced state of digestion and growth, i.e., the newly increased amount of sludge (including the amount of sludge of the wastewater feed and the amount of sludge increased by growth of organisms in the mixed liquor) and the reduced amount of sludge caused by death and digestion of organisms reach a dynamically balanced state, so that there is not a net increment of amount of sludge.

In the wastewater pretreatment method of the present invention, the concentration of water soluble organics in the discharged supernatant is of a relatively high level, thereby advantageously restricting the propagation of filamentous bacteria, reducing oxygen demand (such as aeration rate) and possibility of sludge bulking during oxygen-supplying treatment such as aeration. In addition, a relatively high level of soluble organics also provide sufficient nutrients for organisms, forms a better environment facilitating the metabolism, propagation and programmed cell death of organisms, so that the organisms in sludge is propagated in a large amount and digested in a large amount at the same time.

In addition, in the wastewater pretreatment method of the present invention, the sludge alternatively and repeatedly experiences oxygen-supplying treatment and anoxic treatment, which facilitates the propagation of zooglea and improves sedimentation rate and clarifying effects of sludge. Hence, the wastewater pretreatment method can achieve a relatively high sludge concentration without sludge bulking.

Further, since the most or even all of the first concentrated mixed liquor returns to the step (1), the sludge age is relatively long (e.g., several months, years or even longer). Hence, the microorganisms, which have a relatively slow propagation rate and can digest those usually non-biodegradable substances, can grow and enhance the decomposition ability of sludge. In the meantime, both biodegradable and usually non-biodegradable substances (including dead organisms) in the mixed liquor pass through oxygen-supplying treatment and anoxic treatment in sequence under conditions of high sludge concentration and thus are rapidly digested, so that compounds containing carbon, nitrogen and phosphorus are converted into soluble organics that can be discharged with the supernatant or into volatile substances that escape out.

In sum, in the wastewater pretreatment method of the present invention, the sludge in the mixed liquor has good sedimentation property and low oxygen demand (such as aeration rate) and can degrade various organic substances (including dead organism) to form water soluble substances or gaseous substances, so that the mixed liquor can have a relatively high sludge concentration to allow the floras of organism at a balanced state of digestion and growth without sludge bulking, and the wastewater pretreatment method of the present invention can stably run for a long term and reduce or even totally eliminate sludge discharge.

In some embodiments, the flow rate of the first concentrated mixed liquor can be 10% to 1000%, for example, 10 to 20%, 20 to 30%, 30 to 40%, 40 to 60%, 60 to 80%, 80 to 100%, 100 to 150%, 150 to 200%, 200 to 400%, 400 to 600%, 600 to 800%, 800 to 1000% of the flow rate of the wastewater feed, or in the presence of a feed of other nutritions and/or sludge, the total flow rate thereof. This proportion is also called as the reflux ratio of the first concentrated mixed liquor. A suitable reflux ratio can advantageously enable the oxygen-supplying treatment time and/or anoxic treatment time to be a desired value. In some cases, suitable reflux ratio can be relatively small, such as 10 to 20%, 20 to 30%, 30 to 40%, and 40 to 60% in order to advantageously reduce power consumption. In some other cases, suitable reflux ratio can be relatively great, such as 60 to 80%, 80 to 100%, 100 to 150%, 150 to 200%, 200 to 400%, 400 to 600%, 600 to 800%, 800 to 1000% in order to a shorter oxygen-supplying treatment time and/or anoxic treatment time. The preferable reflux ratio can be 50 to 150%.

In some embodiments of the wastewater pretreatment of the present invention, the oxygen-supplying treatment time of the step (2) is less than the time that aerobic microorganisms become dominant floras (for example, less than the generation cycle of aerobic microorganism, such as less than 5 hours), and the anoxic treatment time of the step (3) is less than the time that anaerobic microorganisms become dominant floras (for example, less than the generation cycle of aerobic microorganism, such as less than about 40 hours) so that facultative microorganisms become dominant floras. Without being limited by any theory, since facultative microorganisms have a generation cycle of about 0.2 to 0.5 hours at room temperature, in a sludge with facultative microorganisms as dominant floras, the growth and programmed cell death of a larger number of microorganisms would occur during alternative oxygen-supplying treatment (aerobic conditions) and anoxic treatment (anoxic and/or anaerobic conditions), thereby digesting and degrading (via metabolism and hydrolysis) various organic substances (including dead organisms) to form soluble substances that are discharged out with the supernatant or form gaseous substances that escape out, especially at high sludge concentration condition.

In some embodiments, the oxygen-supplying treatment time of the step (2) can be less than such as 5 hours so that aerobic microorganisms would not become dominant floras, and can also be greater than such as 0.1 hours so that the propagation of anaerobic microorganisms is inhibited while facultative microorganisms can sufficiently propagate and become dominant floras. In some cases, the oxygen-supplying treatment can be 0.1 to 4 hours, preferably 0.5 to 2 hours, more preferably 0.5 to 1.5 hours, for example, 0.1 to 0.2 hours, 0.2 to 0.3 hours, 0.3 to 0.4 hours, 0.4 to 0.5 hours, 0.5 to 0.6 hours, 0.6 to 0.8 hours, 0.8 to 1 hours, 1 to 1.2 hours, 1.2 to 1.5 hours, 1.5 to 1.8 hours, 1.8 to 2 hours, 2 to 2.2 hours, 2.2 to 2.5 hours, 2.5 to 3 hours or 3.5 to 4 hours. In some embodiments, the oxygen-supplying treatment of the step (2) is performed in a manner of intermittent aeration or continuous aeration.

In some embodiments, the anoxic treatment time of the step (3) can be less than for example 6 hours so that anaerobic microorganisms would not become a dominant floras and the size of apparatus can be advantageously reduced, while in the meantime, the anoxic treatment time of the step (3) can be greater than for example 0.1 hours so that facultative microorganisms can sufficient propagate and aerobic microorganisms are inhibited to allow facultative microorganisms become dominant floras. The anoxic treatment time can be 0.8 to 6 hours, preferably 1 to 4 hours, more preferably 1 to 3 hours, for example, 0.8 to 1 hours, 1 to 1.2 hours, 1.2 to 1.4 hours, 1.4 to 1.6 hours, 1.6 to 1.8 hours, 1.8 to 2 hours, 2 to 2.5 hours, 2.5 to 3 hours, 3 to 3.5 hours, 3.5 to 4 hours, 4 to 4.5 hours, 4.5 to 5 hours, 5 to 5.5 hours or 5.5 to 6 hours. In some embodiments, the anoxic treatment of the step (3) is performed in sedimentation manner. When the anoxic treatment is performed in sedimentation manner, the anoxic treatment time can be advantageously greater than 0.5 hours, especially greater than 1 hour, so that the sedimentation can be completed sufficiently, and the anoxic treatment time can also be less than 4 hours to reduce the size of apparatus.

In some embodiments, the ratio of the oxygen-supplying treatment time to the anoxic treatment time can be 1:0.5 to 1:6, preferably 1:1 to 1:3, more preferably 1:1.5 to 1:2, most preferably 1:2, for example, 1:0.5 to 1:0.6, 1:0.6 to 1:0.7, 1:0.7 to 1:0.8, 1:0.8 to 1:0.9, 1:0.9 to 1:1, 1:1 to 1:1.1, 1:1.1 to 1:1.2, 1:1.2 to 1:1.3, 1:1.3 to 1:1.4, 1:1.4 to 1:1.5, 1:1.5 to 1:1.6, 1:1.6 to 1:1.7, 1:1.7 to 1:1.8, 1:1.8 to 1:1.9, 1:1.9 to 1:2, 1:2 to 1:2.1, 1:2.1 to 1:2.2, 1:2.3 to 1:2.4, 1:2.4 to 1:2.5, 1:2.5 to 1:2.6, 1:2.6 to 1:2.8, 1:2.8 to 1:3, 1:3 to 1:3.2, 1:3.2 to 1:3.4, 1:3.4 to 1:3.6, 1:3.6 to 1:3.8, 1:3.8 to 1:4, 1:4 to 1:4.5, 1:4.5 to 1:5, 1:5 to 1:5.5 or 1:5.5 to 1:6, so that facultative microorganisms become a dominant floras.

In some embodiments, in order to allow that the sludge undergoes sufficient oxygen-supplying treatment so that facultative microorganisms become dominant floras and the digestion and hydrolysis of sludge is promoted, the dissolved oxygen content of the third mixed liquor of the step (2) can be 0.1 to 4 mg/L, preferably 1.5 to 3 mg/L, more preferably 2 to 3 mg/L, for example, 0.1 to 0.3 mg/L, 0.3 to 0.5 mg/L, 0.5 to 0.7 mg/L, 0.7 to 0.9 mg/L, 0.9 to 1.1 mg/L, 1.1 to 1.3 mg/L, 1.3 to 1.5 mg/L, 1.5 to 1.7 mg/L, 1.7 to 1.9 mg/L, 1.9 to 2.1 mg/L, 2.1 to 2.3 mg/L, 2.3 to 2.5 mg/L, 2.5 to 2.7 mg/L, 2.7 to 2.9 mg/L, 2.9 to 3.1 mg/L, 3.1 to 3.3 mg/L, 3.3 to 3.5 mg/L, 3.5 to 3.7 mg/L or 3.7 to 3.9 mg/L.

In some embodiments, the wastewater feed is subjected to an oxygen-supplying treatment before the step (1). Without being limited to any theory, it is considered that this facilitates that facultative microorganisms become dominant floras. In some embodiments, the oxygen-supplying treatment time for the wastewater feed can be 0.1 to 0.5 hours, 0.5 to 1 hours, 1 to 1.5 hours, 1.5 to 2 hours or 2 to 2.5 hours, and the dissolved oxygen content of the such treated wastewater feed can be 0.1 to 0.5 mg/L, 0.5 to 1 mg/L, 1 to 1.5 mg/L, 1.5 to 2 mg/L, 2 to 2.5 mg/L, 2.5 to 3 mg/L, 3 to 3.5 mg/L or 3.5 to 4 mg/L. In some embodiments, such oxygen-supplying treatment is performed in intermittent or continuous manner, for example, in a manner of intermittent aeration or continuous aeration.

In some embodiments, in order to allow that the sludge undergoes sufficient anoxic treatment so that facultative microorganisms become dominant floras and the digestion and hydrolysis of sludge is promoted, the second mixed liquor can be deoxygenated between the step (2) and the step (3). For example, the deoxygenation can be performed by using a degassing basin, in which oxygen-containing bubbles float upward from the mixed liquor, so that the dissolved oxygen content in the mixed liquor would not increase so as to facilitate the following anoxic treatment. According to the wastewater pretreatment method of the present invention, the deoxygenation is performed for a time of 0.1 to 0.2 hours, 0.2 to 0.3 hours, 0.3 to 0.5 hours, 0.5 to 0.8 hours or 0.8 to 1 hours, the second mixed liquor after such treatment has a dissolved oxygen content of less than 0.1 mg/L, less than 0.05 mg/L or about 0 mg/L.

In some embodiments, the ratio of the oxygen-supplying treatment time:the deoxygenation time:the anoxic treatment time can be 1:(0.1 to 0.5):(0.5 to 4), preferably 1:(0.1 to 0.3):(1 to 3), more preferably 1:(0.1 to 0.2):(1.5 to 2.5), for example 1:0.1:1 or 1:0.15:2.

In some embodiments, the second mixed liquor in the step (2) has a sludge volume index (SVI, usually expressed as $SVI_{30}$, which refers to the volume occupied by 1 g of activated sludge solid after 1000 mL of the mixed liquor stands in a 1000 mL volumetric cylinder for 30 minutes, the unit thereof is mL/g) that is less than the minimum SVI that sludge bulking occurs during aeration, for example, $SVI_{30}$ can be less than 300 mL/g, 200 mL/g, 150 mL/g, 100 mL/g, or 50 mL/g.

In some embodiments, the sludge concentration of the second mixed liquor in the step (1) is of a concentration that allows the microorganisms at a balanced state of digestion and growth. According to some embodiments, the second mixed liquor of the step (1) has a sludge concentration of at least about 2000 to 2500 mg/L, 2500 to 3000 mg/L, 3000 to 3500 mg/L, 3500 to 4000 mg/L, 4000 to 4500 mg/L, 4500 to 5000 mg/L, 5000 to 5500 mg/L, 5500 to 6000 mg/L, 6000 to 6500 mg/L, 6500 to 7000 mg/L, 7000 to 7500 mg/L, 7500 to 8000 mg/L, 8000 to 8500 mg/L, 8500 to 9000 mg/L, 9000 to 9500 mg/L, 9500 to 10000 mg/L, 10000 to 12000 mg/L, 12000 to 14000 mg/L, 14000 to 16000 mg/L, 16000 to 18000 mg/L, 18000 to 20000 mg/L or at least about 20000 mg/L, preferably 2000 to 10000 mg/L, more preferably 2500 to 6000 mg/L.

The wastewater pretreatment method according to the present invention can particularly advantageously be used for wastewater pretreatment in site where the wastewater is produced, so that the pretreated wastewater is suitable for common sewage treatment plants. In addition, the wastewater pretreatment method is also suitable for reforming various existing sewage treatment apparatus of activated sludge methods, in which the supernatant obtained after pretreatment of wastewater is introduced into an existing sewage treatment apparatus for further treatment. In the meantime, the residual sludge of the existing sewage treatment apparatus can be mixed with the wastewater feed and then treated according to the wastewater pretreatment method of the present invention. Therefore, the wastewater pretreatment method of the present invention can be used to digest substantially all of the residual sludge of the existing sewage treatment apparatus so that the reformed sewage treatment apparatus substantially does not discharge sludge.

SPECIFIC MODELS FOR CARRYING OUT THE INVENTION

In order to further illustrate the present invention, some preferably embodiments of the present invention are described in combination with the drawings. It should be understood that these descriptions merely intend to further illustrate the features and advantages of the present invention, but do not intend to limit the protection scope of the claims of the present invention.

FIG. 1 is a schematic diagram of structure of a wastewater pretreatment apparatus according to the wastewater pretreatment method of the present invention, in which a wastewater as water influent is introduced to a central aeration basin A1 and mixed with a return sludge (i.e., a first concentrated mixed liquor) from sedimentation basins (S1 and S2) to obtain a first mixed liquor, then the first mixed liquor is subjected to aeration in central aeration basins A1, A2, A3 and A4 in turn to obtain a second mixed liquor, the second mixed liquor enters in the sedimentation basins S1 and S2 and separated to obtain the return sludge and a water effluent (i.e., a supernatant). The dashed line arrow in FIG. 1 shows the flow direction of sludge, and the solid line arrow shows the flow direction of mixed liquor. The wastewater pretreatment apparatus as shown in FIG. 1 is particularly suitable for wastewater pretreatment in site where wastewater (organic wastewater) is produced so that the contaminants in wastewater can be economically and effectively reduced to meet standards of sewage to be discharged to municipal sewer, thereby facilitating the treatment using sewage treatment plants. FIG. 1 shows a wastewater pretreatment apparatus in a manner of concentric circles which can also be used for reforming an existing sewage treatment apparatus or for building a new sewage treatment apparatus.

Figure 2:
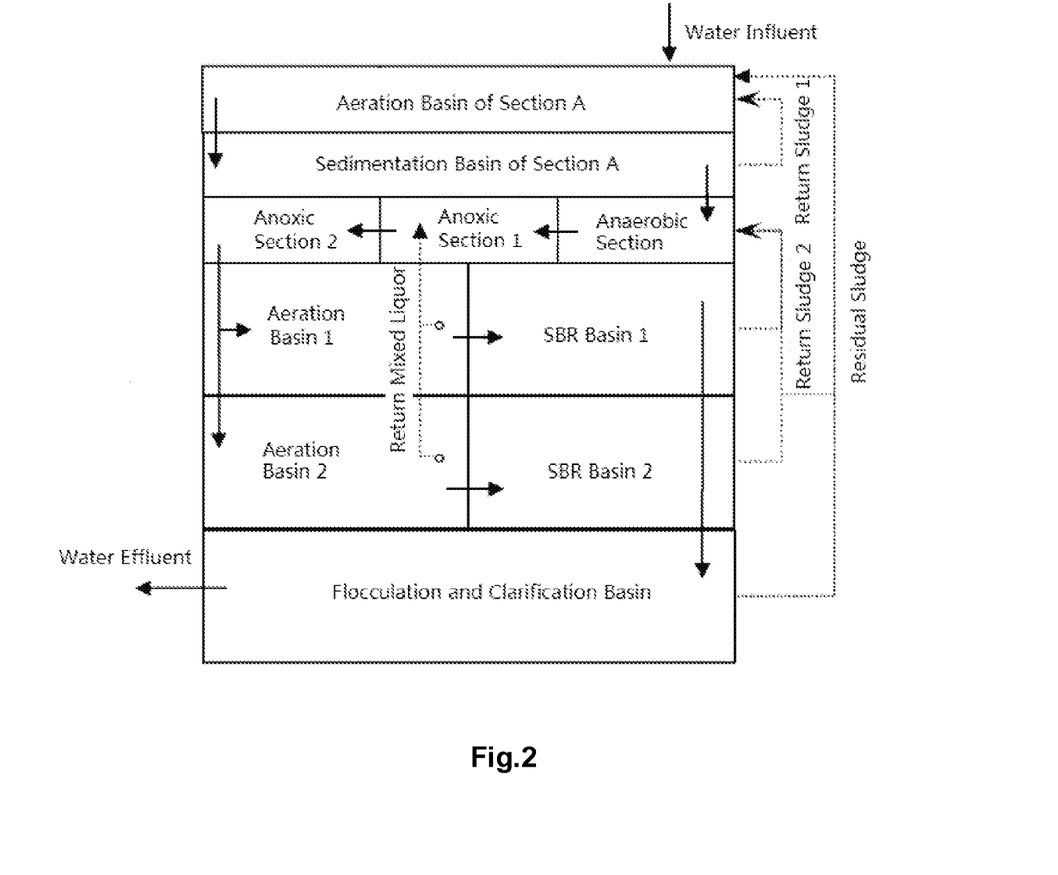
FIG. 2 shows a schematic diagram of structure of a sewage treatment apparatus according to the sewage treatment method of the present invention.

FIG. 2 is a schematic diagram of structure of a sewage treatment apparatus according to the sewage treatment method of the present invention, in which a wastewater feed as water influent is introduced into an aeration basin of section A for aeration treatment, then separated in a sedimentation basin of section A to obtain a first supernatant and a return sludge 1, and the return sludge 1 returns to the aeration basin of the section A, so that the wastewater pretreatment according to the present invention is fulfilled thereby; the first supernatant (i.e., a water effluent of the section A) leaves the sedimentation basin of the section A and passes in turn an anaerobic section, an anoxic section 1 and an anoxic section 2 which constitute a biologic regulation zone, then enters aeration basins 1 and 2 to perform aeration treatment, a part of mixed liquor of the aeration basins 1 and 2 returns to the anoxic section 1, the residual mixed liquor of the aeration basins 1 and 2 separately enters SBR basins 1 and 2 and is separated to obtain a second supernatant (i.e., a second water effluent) and a SBR residual sludge, a part of the SBR residual sludge as return sludge 2 returns to the anaerobic section of the biologic regulation zone, the second supernatant enters a flocculation clarification basin to perform chemical removal of phosphorus to obtain a water effluent (i.e., a third water effluent) and a flocculation clarification residual sludge, the flocculation clarification residual sludge and the other part of the SBR residual sludge are used as return sludge and return to the aeration basin of the section A.

In the examples, t represents ton; DS represents dry sludge; $m^3$ represents cubic meter; d represents day; and COD represents chemical oxygen demand.

EXAMPLE 1

According to the sewage treatment apparatus as shown in FIG. 2, a sewage treatment plant with a capacity of 20000 $m^3/d$ was built, which has successfully run for 1845 days under running conditions as follows: the average volume of treated water was about 9000 $m^3/d$, the fluctuation range of COD of water influent was 647.7±195.9 mg/L, the fluctuation range of ammonia-nitrogen of water influent was 25.45±6.07 mg/L, the fluctuation range of the total nitrogen was 44.12±11.43 mg/L, the fluctuation range of the total phosphorus was 1.85±0.85 mg/L, the fluctuation range of the suspended solid (SS) of the water influent was 291.8±129.8 mg/L, the fluctuation range of the volatile suspended solid (VSS) of the water influent was 159.0±76.1 mg/L, the amount of flocculation agent added to the flocculation clarification basin was about 30 mg of ferrous sulfate per liter, and the whole apparatus substantially did not discharge any sludge during the running period.

During the running, the mixed liquor volatile suspended solids (MLVSS) and the mixed liquor suspended solids (MLSS) of the aeration basin of the section A were separately 2844±681 mg/L and 6623±1593 mg/L; and the MLVSS and MLSS of the SBR basin were separately 2148±334 mg/L and 5372±891 mg/L.

The results show that the fluctuation range of the COD of the first supernatant was 102±19.9 mg/L; the COD of the second supernatant was 43.6±14.0 mg/L; the COD of the water effluent was 29.3±9.3 mg/L; the ammonia-nitrogen of the second supernatant was 0.67±0.52 mg/L; the ammonia-nitrogen of the water effluent was 0.26±0.29 mg/L; the total nitrogen of the second supernatant was 11.84±2.32 mg/L; the total nitrogen of the water effluent was 116.1±1.68 mg/L; the total phosphorus of the second supernatant was 0.14±0.10 mg/L; the total phosphorus of the water effluent was 0.04±0.03 mg/L; the suspended solid of the second supernatant was 16.7±4.5 mg/L; the suspended solid of the water effluent was 2.1±1.0 mg/L; the volatile suspended solid of the second supernatant was 10.1±4.7 mg/L; the volatile suspended solid of the water effluent was 1.5±0.8 mg/L; and there was no apparent sediment in the whole apparatus.

It can be seen that the use of the wastewater pretreatment method of the present invention to build a new sewage treatment system or to reform an existing conventional sewage treatment apparatus can improve the sedimentation property of sludge, inhibit sludge bulking so as to enable the running at a high sludge concentration, reduce the content of contaminants in the wastewater to meet the requirements of sewage biotreatment. In the meantime, the digestion of residual sludge is also fulfilled so that the residual sludge generated by the whole sewage treatment system can be reduced even achieve zero sludge discharge.

The sludge reduction sewage treatment system of the present invention is described in details as above. The number of steps of the method as described in the description and the claims do not represent the sequence of the steps unless the sequence is pointed out or can be exclusively determined. The examples for demonstrating the principle and embodiments of the present invention are intended to understand the method of the present invention. It should be noted that without departing from the principle of the present invention, any improvements and modifications to the present invention can also be made and fall within the scope of the claims.

What is claimed is:

1. A sewage treatment method, comprising the following steps:
   (1) introducing a wastewater feed into a first end of a first aeration basin to mix with a first concentrated mixed liquor to obtain a first mixed liquor;
   (2) aerating the first mixed liquor in an aeration section of the first aeration basin to obtain a second mixed liquor at a second end of the first aeration basin;
   (3) introducing the second mixed liquor to a first sedimentation basin to perform a sedimentation treatment to obtain a supernatant liquid and the first concentrated mixed liquor;

(4) discharging the supernatant liquid, and returning at least a part of the first concentrated mixed liquor to the first end of the first aeration basin so as to have a sludge age of greater than 50 days, wherein the ratio of the aeration treatment time of the first aeration basin to the sedimentation treatment time of the first sedimentation basin is 1:0.5 to 1:6; and (5) passing the supernatant liquid through a biologic regulation zone, a second aeration zone and a second sedimentation zone in turn to obtain a first water effluent and a second concentrated mixed liquor, and returning a first part of the second concentrated mixed liquor to the biologic regulation zone.

2. The sewage treatment method according to claim 1, wherein the first mixed liquor has a sludge concentration of 2,000 to 30,000 mg/L.

3. The sewage treatment method according to claim 1, the aeration treatment time of the first aeration basin is 0.1 to 4 h.

4. The sewage treatment method according to claim 1, wherein the chemical oxygen consumption (COD) of the supernatant liquid is 30 to 500 mg/L.

5. The sewage treatment method according to claim 1, wherein an organic nutrition and/or sludge feed is further introduced together with the wastewater feed into the first end of the first aeration basin and mixed with the first concentrated mixed liquor to obtain the first mixed liquor, the organic nutrition is a domestic sewage containing biodegradable organics, an industrial wastewater derived from agricultural products as raw materials, or a suitable carbon source, and the sludge is a sludge containing an activated sludge generated in a sewage biotreatment process.

6. The sewage treatment method according to claim 1, the aeration treatment in the step (2) is performed in a manner of intermittent aeration or continuous aeration.

7. The sewage treatment method according to claim 1 in the step (2), the second mixed liquor has a dissolved oxygen concentration of 0.1 to 4 mg/L.

8. The sewage treatment according to claim 1, the first mixed liquor, the second mixed liquor and the first concentrated mixed liquor contain facultative microorganisms as dominant floras.

9. The sewage treatment method according to claim 1, wherein the first aeration basin and the first sedimentation basin are operated in plug flow manner.

10. The sewage treatment method according to claim 1, the fluid residence time of the biologic regulation zone is 0.2 to 2 h.

11. The sewage treatment method according to claim 1, wherein the aeration treatment time of the second aeration zone is 0.5 to 4 h.

12. The sewage treatment method according to claim 1, wherein the sedimentation treatment time is 0.8 to 6 h.

13. The sewage treatment method according to claim 1, the biologic regulation zone comprises an anaerobic section and an anoxic section, the supernatant liquid and the first part of the second concentrated mixed liquor are mixed in and then pass through the anaerobic section to obtain a third mixed liquor, the third mixed liquor and a first part of a fifth mixed liquor are mixed in and pass through the anoxic section to obtain a fourth mixed liquor, the fourth mixed liquor enters the second aeration zone and is subjected to aeration treatment to obtain the fifth mixed liquor, the first part of the fifth mixed liquor returns to the anoxic section, the residual part of the fifth mixed liquor enters the second sedimentation zone and is separated to obtain the first water effluent and the second concentrated mixed liquor, and the first part of the second concentrated mixed liquor returns to the anaerobic section.

14. The sewage treatment method according to claim 13, wherein the anaerobic section of the biologic regulation zone has a fluid residence time of 0.1 to 1.5 h.

15. The sewage treatment method according to claim 13, wherein the anoxic section of the biologic regulation zone has a fluid residence time of 0.1 to 1.8 h.

16. The sewage treatment method according to claim 13 wherein the ratio of the fluid residence time of the anaerobic section to the fluid residence time of the anoxic section in the biologic regulation zone is 1:0.5 to 1:6.

17. The sewage treatment method according to claim 13, wherein the fourth mixed liquor has a sludge concentration of 2000 to 6000 mg/L.

18. The sewage treatment method according to claim 13, wherein the first part of the fifth mixed liquor has a flow rate of 10% to 150% relative to the flow rate of the sewage feed.

19. The sewage treatment method according to claim 13, wherein the first part of the second concentrated mixed liquor has a flow rate of 10% to 150% relative to the flow rate of the sewage feed.

20. The sewage treatment method according to claim 13, wherein at least part of the residual part of the second concentrated mixed liquor returns to the first end of the first aeration basin of the wastewater pretreatment method.

21. The sewage treatment method according to claim 1, wherein the supernatant liquid is used as a sewage feed and subjected to a biotreatment according to Wuhrmann process, A/O process, Bardenpho process, Phoredox process, $A^2$/O process, reversed $A^2$/O process, UCT process, MUCT process, VIP process, OWASA process, JHB process, TNCU process, Dephanox process, BCFS process, MSBR process, SBR process, AB process, oxidation ditch process, biomembrane process, moving bed process or a combination thereof, to obtain the first water effluent.

22. The sewage treatment method according to claim 1, wherein the first water effluent is introduced to a flocculation and clarification basin for the treatment of flocculation and clarification to obtain a second water effluent and a flocculation sludge.

23. The sewage treatment method according to claim 22, wherein at least part, of the flocculation sludge returns to the first end of the first aeration basin of the wastewater pretreatment method.

* * * * *